US005638096A

United States Patent [19]
Schwartz

[11] Patent Number: 5,638,096
[45] Date of Patent: Jun. 10, 1997

[54] COMPUTER SCREEN FRAME

[75] Inventor: Russell J. Schwartz, Sonoma, Calif.

[73] Assignee: Screenies, Sonoma, Calif.

[21] Appl. No.: 512,038

[22] Filed: Aug. 7, 1995

Related U.S. Application Data

[63] Continuation of Ser. No. 335,110, Nov. 7, 1994, abandoned, which is a continuation of Ser. No. 80,319, Jun. 22, 1993, abandoned.

[51] Int. Cl.$^6$ ........................................... G09G 1/00
[52] U.S. Cl. .................. 248/442.2; 248/918; D14/114; 345/905
[58] Field of Search .................. 345/905; 248/442.2, 248/450, 918; 434/365; D14/100, 106, 107, 113, 114; 312/223.2, 223.3; 40/768, 773, 596; 361/679, 681, 682, 833

[56] References Cited

U.S. PATENT DOCUMENTS

| | | |
|---|---|---|
| 4,572,592 | 2/1986 | Haven . |
| 4,612,583 | 9/1986 | Ayervais . |
| 4,632,471 | 12/1986 | Visnapun ........................ 248/442.2 |
| 4,834,330 | 5/1989 | Swillinger ....................... 248/205.2 |
| 5,067,681 | 11/1991 | Huang et al. ........................ 248/918 |
| 5,104,087 | 4/1992 | Wentzloff et al. . |
| 5,113,435 | 5/1992 | Chen .................................. 379/368 |
| 5,125,612 | 6/1992 | McNeal ........................... 248/442.2 |
| 5,175,627 | 12/1992 | Josephs . |
| 5,328,145 | 7/1994 | Charapich . |

FOREIGN PATENT DOCUMENTS

| | | |
|---|---|---|
| 99852 | 12/1980 | Japan . |
| 2252219 | 7/1992 | United Kingdom . |

OTHER PUBLICATIONS

"Mac Warehouse" 1992 p. 78.

*Primary Examiner*—Kee M. Tung
*Assistant Examiner*—Doon Chow
*Attorney, Agent, or Firm*—Morrison and Foerster LLP

[57] ABSTRACT

This invention provides a device that enhances a computer user's visual environment by providing a useful and/or aesthetically pleasing frame for the computer display screen. In a preferred embodiment, the screen is removably attached to the bezel of a computer display in a manner that permits substantially the entire display screen to be viewed through an opening in the screen frame.

6 Claims, 2 Drawing Sheets

COMPUTER SCREEN FRAME

This application is a continuation of application Ser. No. 08/335,110, filed Nov. 7, 1994, now abandoned, which is a continuation of application Ser. No. 08/080,319 filed Jun. 22, 1993, now abandoned.

BACKGROUND OF THE INVENTION

This invention relates generally to a computer screen frame. In particular, this invention relates to a frame that can be easily attached to a computer screen by the user for decorative or utilitarian purposes. The frame can also be easily removed by the user and replaced with another decorative or utilitarian frame, if desired.

Computer displays serve as the focus of attention in office and home environments. Computer users spend countless hours facing their computer displays. Some computer users have attempted to place other objects near the display to be within the user's field of view. These objects include useful items such as notes taped or otherwise attached to the display bezel and decorative items placed on top of or near the screen in an effort to enhance the aesthetic quality of the user's environment.

U.S. Pat. No. 5,104,087 discloses a note/memo board designed to surround a computer display housing on three sides. The board attaches to the display housing with angle brackets backed with VELCRO® material that mate with VELCRO® material strips on the sides and top of the display. The note/memo board, however, mounts back from the plane of the computer screen and is therefore out of the field of the user's focus.

U.S. Pat. No. 5,175,627 discloses a television screen frame designed to block unused parts of the screen when the user is viewing a video performance that occupies only part of the screen. The screen frame attaches to the television with VELCRO® material tabs.

SUMMARY OF THE INVENTION

This invention provides a device that enhances a computer user's visual environment by providing a useful and/or decorative frame for the computer display screen. In a preferred embodiment, the screen is removably attached to the bezel of a computer display in a manner that permits substantially the entire display screen to be viewed through an opening in the screen frame.

DETAILED DESCRIPTION OF THE PREFERRED EMBODIMENTS

Figure 1:
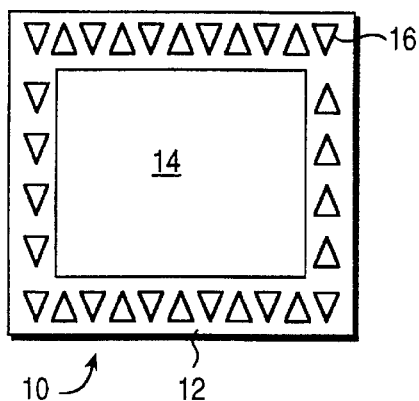
FIG. 1 is a front elevational view of a screen frame according to a preferred embodiment of this invention.

FIG. 1 shows a screen frame according to a preferred embodiment of this invention. Screen frame 10 has four sides 12 defining a central opening 14. In the preferred embodiment, the diagonal length of opening 14 is sized to accommodate the computer display screen size, which is typically between 13 and 15 inches.

Figure 7:
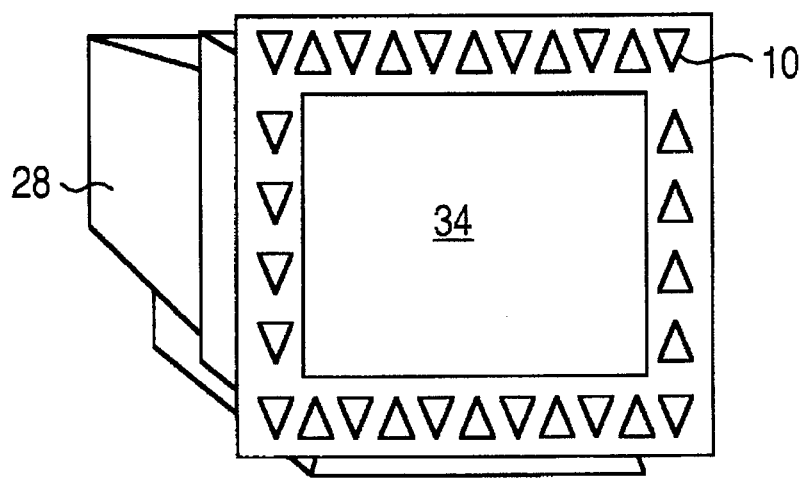
FIG. 7 shows a screen frame according to this invention mounted on a computer display.

The top surface 16 of frame 10 provides the visual environment enhancement aspects of the invention. In one preferred embodiment, surface 16 supports a decorative, aesthetically pleasing graphic or pictorial design, as shown in FIGS. 1 and 7. In another embodiment, surface 16 supports a cork board, white board, or other message-holding or writing surface to provide a surface on which the user can place notes, drawings, or other printed or graphic material.

Figure 2:
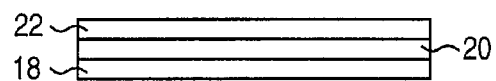
FIG. 2 is a side cross-sectional view of the screen frame shown in FIG. 1.

FIG. 2 is a side cross-sectional view of the screen frame shown in FIG. 1. The dimensions have been exaggerated for discussion purposes. The bottom support layer 18 provides stiffness for support of the frame. In the preferred embodiment, layer 18 is made from chip board, although other materials, such as plastic, may be used as well.

Mounted on support layer 18 is a decorative graphic or pictorial design layer 20, preferably of printed paper and mounted on support layer 18 with glue. A substantially transparent protective layer 22 of varnish or a plastic layer protecting the design layer from ultraviolet light and water covers design layer 20. A laminate layer may be used in addition to, or in place of, protective layer 22.

Figure 3:
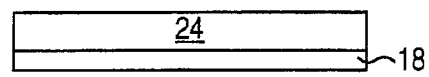
FIG. 3 is a side cross-sectional view of a screen frame according to another preferred embodiment.

In another preferred embodiment, a cork board or writing board 24 is used in place of design layer 20 and protective layer 22, as shown in FIG. 3. The cork board may be made from any permeable material that can accept pins or other attachment device. The writing board is a "white board", a chalk board, a pressure-sensitive plastic writing surface, or any other writing surface. Multiple layers of paper may also be used in place of the cork board or writing board so that the user can tear off the top layer to present a clean writing surface.

Figure 5:
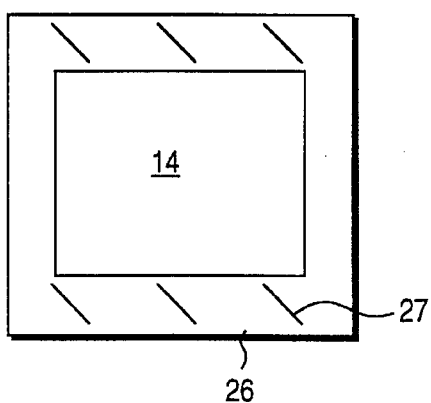
FIG. 5 is a side cross-sectional view of the screen frame of FIG. 4.
Figure 4:
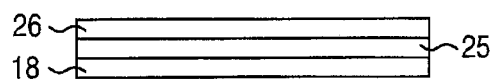
FIG. 4 is a front elevational view of a screen frame according to yet another preferred embodiment of this invention.

In yet another embodiment, the screen frame may be designed as a holder for photographs or other objects. Two vinyl layers 25 and 26 are mounted on top of support layer 18 in place of design layer 20 and protective layer 22, as shown in FIG. 4. The top vinyl layer 26 has multiple slits 27 that create pockets for holding photographs or other objects, as shown in FIG. 5.

Figure 6:
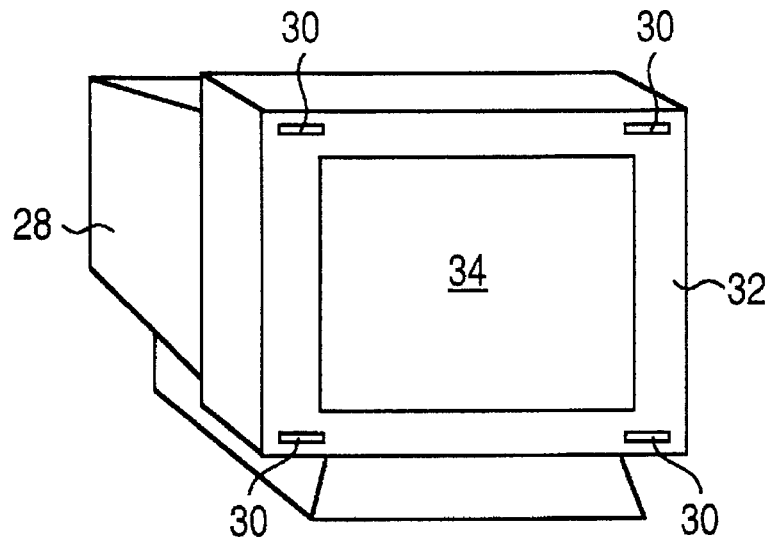
FIG. 6 is a front elevational view of the computer display screen prior to attachment of a screen frame of this invention.

FIG. 6 shows a preferred means for attaching the screen frame of this invention to a computer display 28. A first set of strips 30 of VELCRO® material is adhesively attached in each corner of the computer display bezel 32 bordering the display screen 31. A second set of VELCRO® material strips is mated with the first set. The second set of strips is provided with adhesive on their back surfaces.

The back surface of the screen frame 10 is then pressed against the adhesive surfaces of the second set of VELCRO® material strips so that the screen frame 10 surrounds the computer screen 34, as shown in FIG. 7. Since the bond strength between the adhesive on the second set of VELCRO® material strips and the back surface of the screen frame 10 and the bond strength between the adhesive on the back surfaces of the first set of VELCRO® material strips and the computer display bezel are both stronger than the attachment strength between the two sets of VELCRO® material strips, when the user pulls the screen frame 10 away from the computer display bezel, the two sets of VELCRO® material strips separate. The user can then easily replace the removed screen frame with a different screen frame of the user's choice.

It should be understood that, while the screen frame of this invention permits substantially the entire computer display screen to be seen, portions of the aesthetic design on a particular screen frame might extend partially into the area of the computer display screen.

Variations of the embodiments described above are within the scope of this invention. For example, other means of attaching the screen frame to the computer display bezel may be used, such as adhesive, screws, suction cups, straps or adhesive tape. In addition, the screen frame may be used to support game and amusement items. Other modifications of this invention will be apparent to those skilled in the art.

What is claimed is:

1. A computer display frame comprising:

a frame body;

an opening in the frame body, an opening in the frame body, and means for attaching the frame body to the front surface of a bezel of a computer display, the frame body comprising a support layer, a decorative layer disposed on the support layer, and a substantially transparent protective layer disposed on the decorative layer, the opening adapted to surround a display screen without blocking any substantial part of the display screen and without extending to an outer periphery of the bezel.

2. The display frame of claim 1 wherein the means for attaching comprises an adhesive material strip.

3. A decorative computer display comprising:

a computer display having a display screen and a bezel around the screen, a computer display frame comprising:

a frame body;

an opening in the frame body, and means for attaching the frame body to the front surface of a bezel of a computer display, the frame body comprising a support layer, a decorative layer disposed on the support layer, and substantially transparent protective layer disposed on the decorative layer, the opening adapted to surround the display screen without blocking any substantial part of the display screen and without extending to an outer periphery of the bezel.

4. The display frame of claim 3 wherein the means for attaching comprises cooperating adhesive material strips on the frame body and on the display border.

5. The computer display frame of claim 1 or 3 wherein said transparent protective layer is made of plastic.

6. A computer display frame comprising:

a frame body;

an opening in the frame body, and means for attaching the frame body to the front surface of a bezel of a computer display, the frame body comprising means for displaying photographs, said means for displaying photographs comprising a transparent layer disposed on the support layer, the transparent layer having a plurality of slots formed therein, the opening adapted to surround a display screen and without extending to an outer periphery of the bezel.

* * * * *